(12) United States Patent
Dairon et al.

(10) Patent No.: US 7,331,402 B2
(45) Date of Patent: Feb. 19, 2008

(54) DEVICE FOR ATTACHING BLADES TO RINGS CONNECTED TO A ROTATING SHAFT FOR AN AGRICULTURAL MACHINE

(75) Inventors: Michel Maurice Dairon, Pruille l'Eguille (FR); José Alain Loyer, Mansigne (FR)

(73) Assignee: SAS Dairon, Mulsanne (FR)

( * ) Notice: Subject to any disclaimer, the term of this patent is extended or adjusted under 35 U.S.C. 154(b) by 0 days.

(21) Appl. No.: 11/671,652

(22) Filed: Feb. 6, 2007

(65) Prior Publication Data

US 2007/0187123 A1 Aug. 16, 2007

(30) Foreign Application Priority Data

Feb. 8, 2006 (FR) .................................. 06 50453

(51) Int. Cl.
*A01B 15/00* (2006.01)
*A01B 21/02* (2006.01)
*A01B 23/00* (2006.01)
*A01B 31/00* (2006.01)
*A01B 33/00* (2006.01)

(52) U.S. Cl. ...................... 172/123; 172/548; 172/553; 172/753; 172/772

(58) Field of Classification Search ................... 172/13, 172/15, 21, 22, 118, 122, 123, 518, 540, 548, 172/553, 554, 579, 599, 604, 681, 753, 772, 172/772.5
See application file for complete search history.

(56) References Cited

U.S. PATENT DOCUMENTS

| | | | |
|---|---|---|---|
| 2,244,099 | A | 6/1941 | Chase |
| 3,734,197 | A | 5/1973 | Zehrung, Jr. |
| 2004/0016553 | A1 | 1/2004 | Martindale |
| 2005/0229572 | A1 | 10/2005 | Dairon et al. |

FOREIGN PATENT DOCUMENTS

| GB | 2 403 121 | 12/2004 |
|---|---|---|
| WO | WO 2004/028236 | 4/2004 |

*Primary Examiner*—Christopher J. Novosad
(74) *Attorney, Agent, or Firm*—Leydig, Voit & Mayer, Ltd.

(57) ABSTRACT

A device for attaching blades to rings which are integrally connected to a rotating shaft for an agricultural machine. Each ring has several cutouts which can receive, by nesting support feet of flat segments, each segment bearing one or several blades, for mounting the segments to the ring adjacent to each other in a circumferential direction and for configuring the segments into a blade support disc.

10 Claims, 4 Drawing Sheets

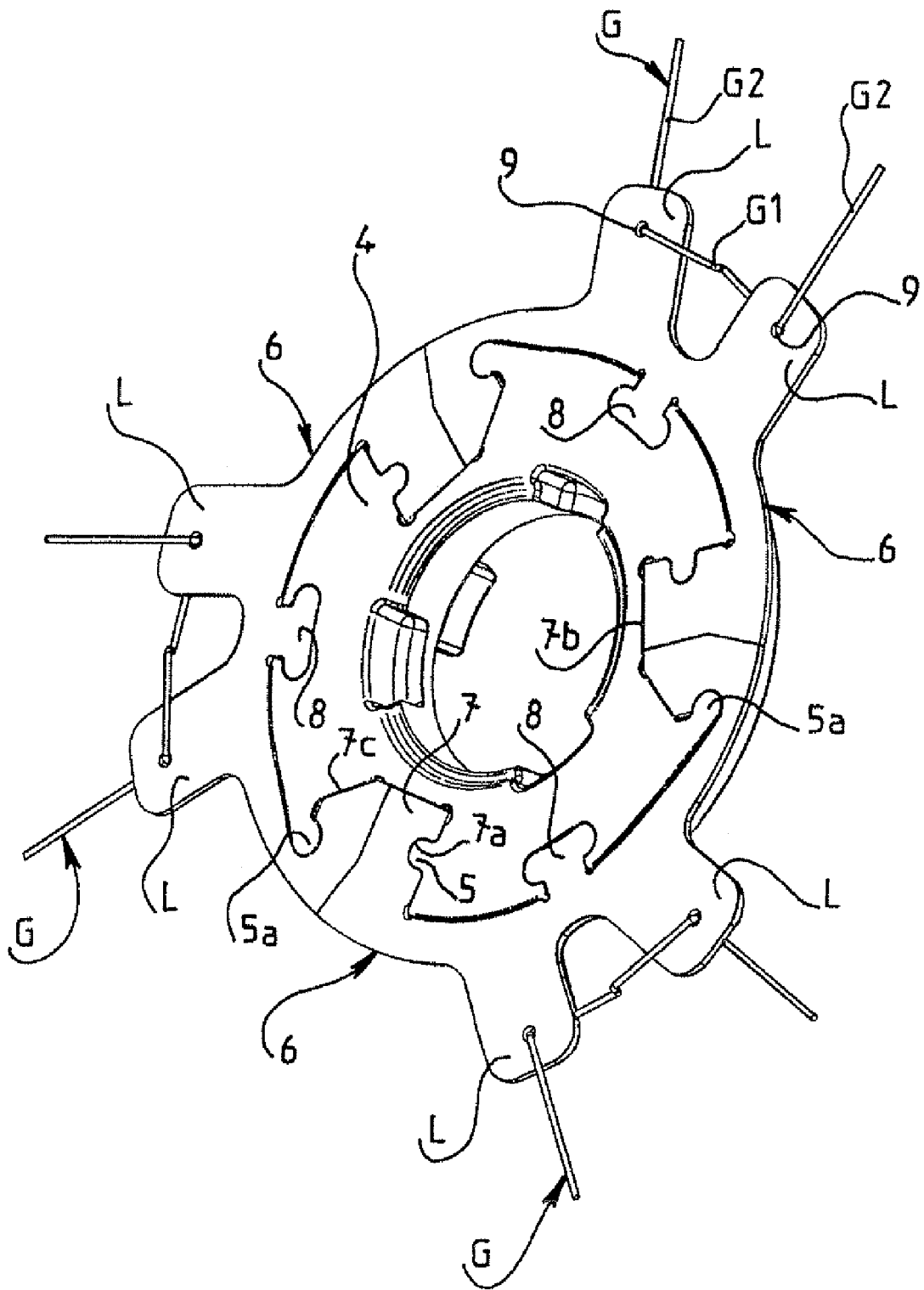

DEVICE FOR ATTACHING BLADES TO RINGS CONNECTED TO A ROTATING SHAFT FOR AN AGRICULTURAL MACHINE

FIELD OF THE INVENTION

The present invention has to do with a device for attaching blades to transversely connected rings of a rotating shaft.

It applies in particular to an agricultural machine, such as for example, a rejuvenator-scarifier, equipped with a rotating shaft with rings bearing such blades.

BACKGROUND

Such a device is known and described in international patent application WO 2004/028236, submitted in the name of the applicant.

According to this known device, several knife-like soil-working blades are housed by encasing their respective feet respectively in impressions formed in the respectively corresponding side faces of the rings, which are mounted in a line on the rotating shaft and tightened axially and jointly one against the other by axial tightening means so as to keep the blades inside their respective impressions.

In order to change a defective blade, it suffices to loosen the rings slightly to allow the blade to be withdrawn laterally from its impression in the corresponding ring and to withdraw it radially.

SUMMARY OF THE INVENTION

The present invention has the purpose of perfecting this known device and of allowing a larger number of blades to be attached to their respective rings so as to create blade support discs.

To that end, according to the invention, the device for attaching blades or analogous devices to transverse rings connected to a rotating shaft, in which the blades extend radially outside the rings which each include at least one cutout or impression on one side face of the ring opening out at the periphery of the ring and shaped to receive by nesting and to retain radially at least one complementary flat part forming a blade support foot so that the outer side of the support foot is flush with the corresponding outer surface of the ring, the rings being mounted in a line on the rotating shaft and tightened axially and jointly against each other by axial tightening means allowing the successive side faces of the rings opposite the side faces each having at least one cutout to bear against the latter and against the blade support feet in order to lock them completely inside their respective cutouts, is characterized in that each ring has several impressions capable of receiving, by nesting, support feet for flat segments, each including at least one blade, to assemble said segments to the ring adjacent to one another circumferentially and to configure them into a blade support disc.

Each blade segment includes at least two radially internal opposing support feet, each being nested in a mating part of an impression of the corresponding ring, two adjacent feet of two blade segments being encased side by side in the same mating impression.

Each blade segment includes at least a third radially internal support foot placed between the two opposed support feet and being nested in a mating impression in the corresponding ring situated between the two other impressions of this ring.

The third blade segment foot is approximately in the shape of an inverted T.

Each of the opposing feet of a blade segment includes an internal boss or recess which extends in a circumferential direction with respect to the segment and which can engage in a boss or recess joined to a side of the corresponding impression, extending in a circumferential direction with respect to the ring.

One of the exterior lateral sides of an opposed support foot of a blade segment has an inward obtuse angle with which it is possible to engage the external side having an outward obtuse angle protruding from an opposed support foot of the adjacent blade segment when the two feet are engaged in their common ring impression.

In the nested position of each blade segment in the corresponding side of the ring, the inside arched edge of the segment bears against a corresponding part of the external circular periphery of the ring.

Each blade segment carries two or several blades on the outside.

Three blade segments may be attached to the corresponding ring.

The blade segments have a sawtooth configuration.

BRIEF DESCRIPTION OF DRAWING FIGURES

The invention can be better understood, and other purposes, characteristics, details, and advantages of the same will appear more clearly in the following explanatory description with reference to the appended schematic drawings, given solely by way of illustrative example of one embodiment of the invention, in which:

FIG. 5 is a view similar to that of FIG. 2, according to which the ring has blades which themselves bear scarifying claws.

DETAILED DESCRIPTION

Figure 1:
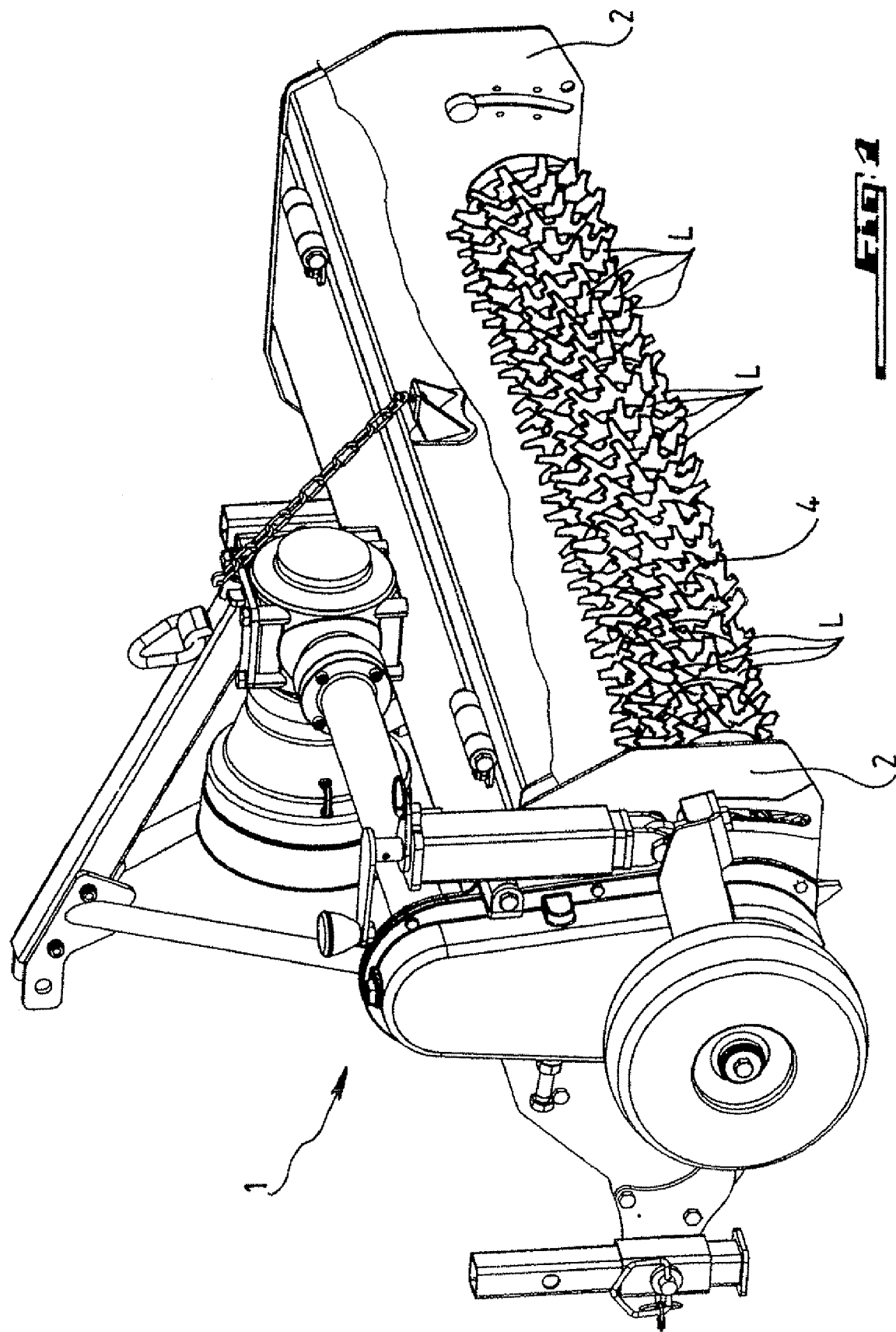
FIG. 1 is an oblique view of an agricultural machine equipped with a rotating shaft with rings to which blades are attached according to the invention.

Referring to FIGS. 1 through 4, the soil rejuvenator-scarifier farm machine includes a rolling frame 1 which can be coupled to a driving machine such as a tractor (not shown), and has two side walls 2 between which is arranged a transverse rotating shaft 3 driven after being engaged by force of the driving machine.

The rotating shaft 3 has all along its length rings 4 arranged transversely and on which soil working blades L are attached projecting to the outside.

The shaft 3 is set into rotation by known transmission means, described, for example, in the applicant=s international application patent WO 2004/028236.

According to the invention, each ring 4 has several cutouts or impressions 5 formed in one of the ring 4 sides such that they open out on the one hand at the outer periphery of the ring and on the other laterally from the side face of the latter.

The impressions 5 are shaped to receive by nesting and to retain radially complementary flat parts forming flat support feet segment 6 of blades L, to allow these segments 6, once assembled in their ring, to be arranged adjacent one to another in the circumferential direction of the ring, making a disc bearing blades L which, as shown in the figures, can have a sawtooth configuration.

Each segment 6 is represented as including four blades 2, but of course it can include only one or a number other than four.

As represented in the figures, each disc is formed of three blade L segments 6, but it can also be made of two diametrically opposed segments or by a number of segments greater than three, regularly spaced in a circumferential orientation on the corresponding ring 4.

Each respective segment 6 of blades L has three radially internal feet, two opposed end feet 7 and a central foot 8.

The central foot 8 has the general shape of an inverted AT@ that can engage by nesting in its mating impression 5 formed in the side face of the ring 4.

One of the end feet 7 of segment 6 can engage by nesting in approximately half of the mating impression 5 spaced circumferentially from the impression 5 designated to receive the central foot 8 of this segment. The other end foot 7 of this segment can also engage by nesting in approximately one half of the mating impression 5 spaced circumferentially from the impression 5 designed to receive the central foot 8, which is located approximately midway between the two opposed impressions 5 which receives the two end feet 7 of segment 6 of blades L.

Two adjacent segments 6 with blades L are assembled to the ring 4 so that two of their adjacent respective end feet 7 are nested in the same mating impression 5, with the two respective external edges of these two end feet 7 bearing against one another.

Each end foot 7 of a segment 6 with blades L has a recess 7a in the inside edge of the foot 7, into which can nest a boss 5a joined to and jutting circumferentially from an edge defining in part the impression 5 for receiving this end foot 7.

Figure 3:
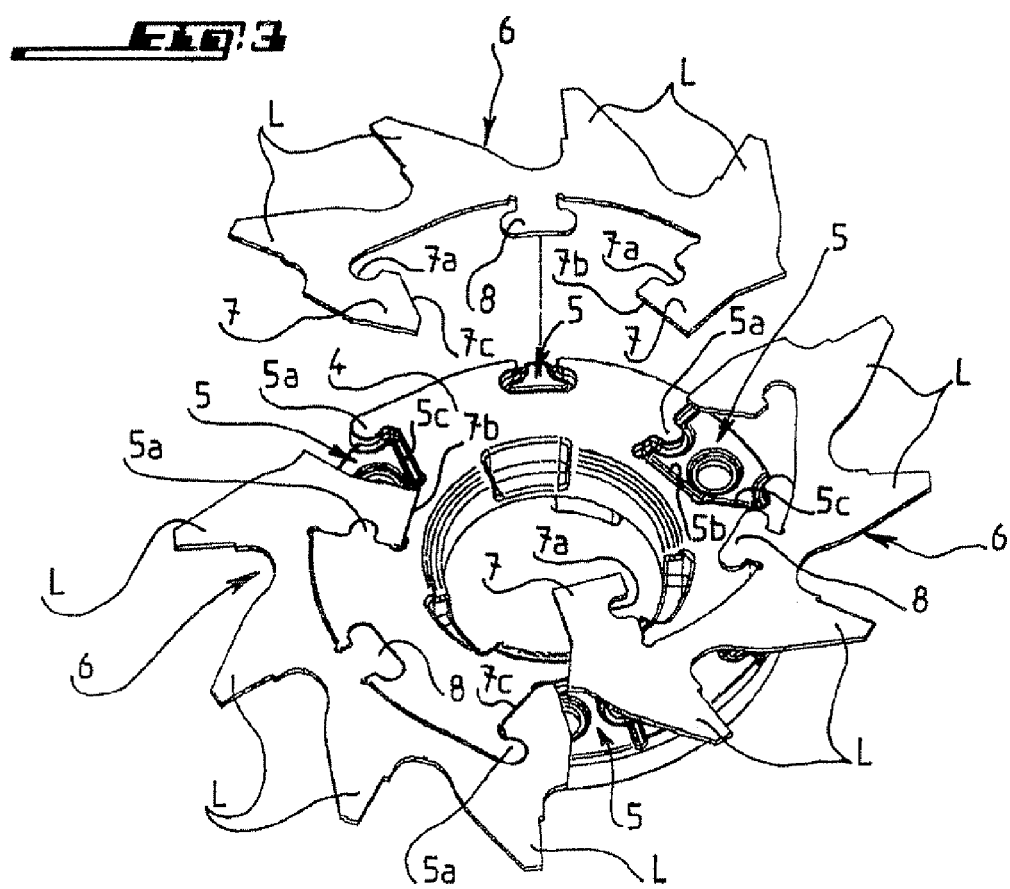
FIG. 3 is a partially exploded oblique view of the ring and blades in FIG. 2.
Figure 4:
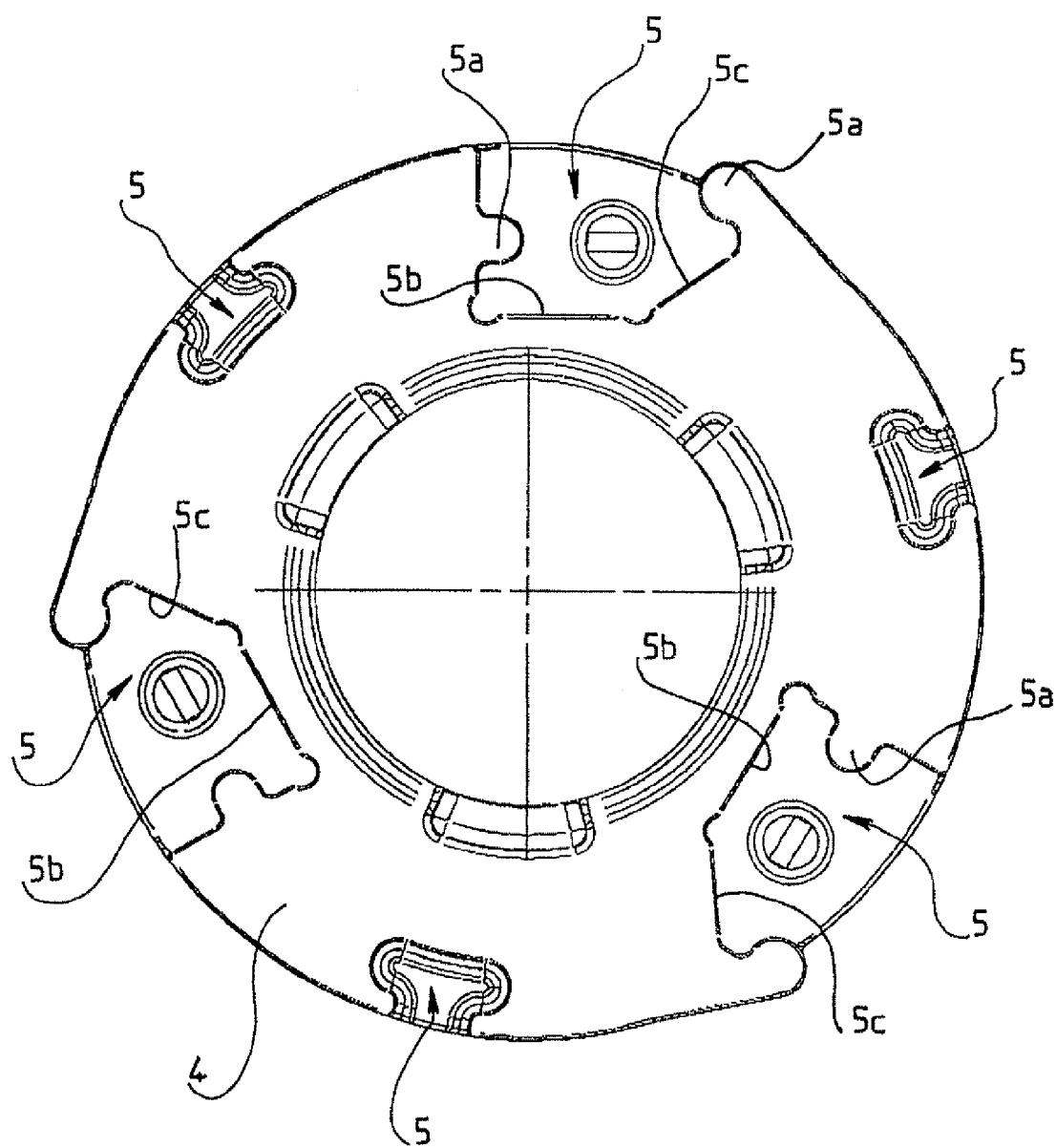
FIG. 4 is a top view of the ring in FIGS. 2 and 3 comprising impressions for receiving and holding the blade segments.

As can be seen more clearly in FIG. 3, the recess 7a of one of the end feet 7 of the corresponding segment 6 with blades L is formed in the continuation of the inner arched edge of this segment, while the recess 7a of the other end foot 7 of the segment is formed approximately in the middle of this foot at a certain distance from the internal arched edge of the segment. By this configuration, each impression 5 is designed to receive two adjacent end feet 7 respectively of the two segments adjacent to one of its bosses 5a, where this juts out from the corresponding edge partially defining the impression 5 in a circumferential direction of the ring 4 with its outer edge extending the ring 4 circular peripheral edge, which engages in the recess 7a of the corresponding end foot 7 of the associated segment that is situated as a continuation of the arched internal edge of this segment. The other boss 5a of the impression 5, jutting out from the opposite edge which partially defines the same impression 5, and located approximately in the middle of this edge, engages in the corresponding recess 7a of the end foot 7 of the adjacent segment 6 with blades L. In this manner, two consecutive segment feet 6 with blades L are held radially in the same impression 5 by the two bosses 5a which face each other in this impression.

In the assembled position, the adjacent segments 6 with blades L in their respective ring impressions 5 are placed on the same plane perpendicular to the ring 4 rotation axis and are flush with the corresponding side face of the ring, where the impressions 5 open out. In addition, the internal arched edges of the segments 6 with blades L are in fact supported by the corresponding external circular edges of the ring 4.

Figure 2:
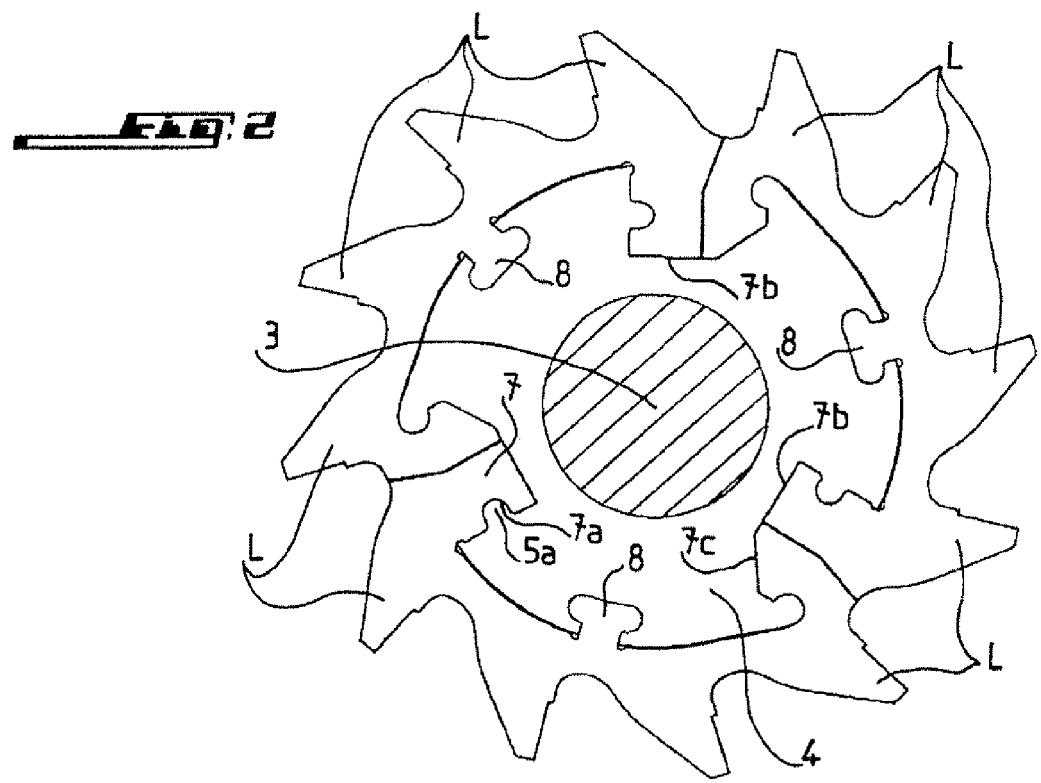
FIG. 2 is a front view of a ring with three blade segments in accordance with the invention.

The two end feet 7 of each blade L segment can have a different shape, as represented in FIGS. 2 and 3. Thus, one of these feet can have an approximately rectangular shape in which the straight-line edge of the end 7b can bear against the corresponding straight-line bottom edge of the impression 5, while the other end foot 7 is with its recess 7a is approximately in the shape of a hook of which the edge of the end 7c is inclined so as to bear against the other inclined edge 5c which defines the bottom of the impression 5 which receives the adjacent feet 7, the two bottom edges of this impression creating between them an obtuse angle.

In addition, the two external side edges of the two feet 7, designed to bear against each other in the assembled position of the two adjacent segments 6 with blades L or ring 4 can respectively delineate a pair of inward and outward angles that mesh.

Of course, the different segments 6 of serrated blades L which form the sawtooth discs are maintained inside their respective impressions 5 in the rings 4 by axial tightening together of the rings, as in international patent application WO 2004/028236.

In addition, the recesses 7a of foot 7 of segments 6 can be replaced by bosses and the bosses 5a of the impressions 5 would then be replaced by corresponding recesses.

Various modifications may be made to the inventive device. Thus, it is possible to provide for two or more support feet 8 between the two outer feet 7 of each segment 6 of blades L. In addition, as represented in FIG. 5 where the three segments 6 each carry blades L, the latter instead of being cutting blades in the manner of the blades L of segments 6 described above, are themselves used to carry, by means of pairs of blades of one segment 6, a scarifying claw G extending radially from the corresponding segment 6 in the extension of blades L. More specifically, each claw G consists of an approximately U-shaped steel strip in which the core G1 extends between the two flat blades L in a direction more or less circumferential to the ring 4 and passes through two holes 9 respectively in the two blades L such that the prongs G2 of the claw G each extend outside the corresponding blade L in the extension of the latter.

The invention claimed is:

1. A device for fastening blades to rings, the rings being transversely attached to a rotating shaft, in which the blades extending radially outward from the rings, each ring having at least one cutout in a side face of the ring, beginning at a periphery of the ring, and shaped to receive and to retain radially at least one complementary flat part of a blade support foot such that a side surface of the support foot is flush with a corresponding outer surface of the side face of the ring, the rings being mounted in a line on the rotating shaft and tightened axially and jointly against each other by axial tightening means in which successive opposite ring side faces, each having a cutout, bear against a side face having a cutout and against the blade support feet, locking the support feet completely inside respective cutouts, wherein each ring includes a plurality of cutouts which can receive, by nesting, support feet for flat blade segments, each blade segment bears at least one blade, and the blade segments of the ring are adjacent to one another in a circumferential direction, arranged in a support disc for the blade.

2. The device in accordance with claim 1, wherein each blade segment comprises at least two opposing radially internal support feet, each internal support foot fitting into a mating part of a cutout in a corresponding ring, and adjacent feet of the two blade segments fit side-by-side in the same mating cutout.

3. The device according to claim 2, wherein each blade segment has at least a third radially internal support foot located between the two opposed support feet and fitting into a mating cutout in the corresponding ring, located between the other two cutouts in the ring.

4. The device according to claim 3, wherein the third foot of the blade segment has an approximate shape of an inverted T.

5. The device according to claim 3, wherein the three blade segments can be attached to the corresponding ring.

6. The device according to claim 2, wherein each of the opposing feet of a blade segment has an internal boss or recess which extends in a circumferential direction from the blade segment and fits into a mating boss or recess in one side of the corresponding cutout and which extends in a circumferential direction of the ring.

7. The device according to claim 2, wherein one of outer sides of an opposed support foot of a blade segment has an inward obtuse angle in which may be fitted an outer side which has an outward obtuse angle of an opposed support foot of an adjacent blade segment when both feet are engaged in a common cutout of the ring.

8. The device according to claim 1, wherein at an embedded position of each blade segment in the side face of the corresponding ring, an internal arched edge of the segment bears against a corresponding part of an external circular periphery of the ring.

9. The device according to claim 1, wherein each blade segment has at least two external blades.

10. The device according to claim 1, wherein the blades have a sawtooth configuration.

* * * * *